(12) United States Patent
Park et al.

(10) Patent No.: US 6,688,343 B1
(45) Date of Patent: Feb. 10, 2004

(54) APPARATUS FOR FILLING INSULATION MATERIAL AND METHOD THEREOF

(75) Inventors: Hun-Yong Park, Choongcheongnam-do (KR); Hyun-Chul Sim, Choongcheongnam-do (KR); Do-Yeon Kim, Kyunggi-do (KR)

(73) Assignees: Samson Co., Ltd., Seoul (KR); Samson Perlite Co., Ltd., Choongcheongnam-do (KR)

( * ) Notice: Subject to any disclaimer, the term of this patent is extended or adjusted under 35 U.S.C. 154(b) by 0 days.

(21) Appl. No.: 10/252,062

(22) Filed: Sep. 20, 2002

(51) Int. Cl.⁷ .................................................. B65B 1/04
(52) U.S. Cl. ........................ 141/95; 141/198; 141/12; 141/71
(58) Field of Search ............................ 141/95, 198, 12, 141/11, 71–81

(56) References Cited

U.S. PATENT DOCUMENTS

| 3,633,878 A | 1/1972 | Mendius, Jr. |
| 3,731,907 A | 5/1973 | Lash |
| 4,019,547 A * | 4/1977 | Ross ........................... 141/11 |
| 4,614,436 A | 9/1986 | Setterberg |
| 4,633,086 A | 12/1986 | Parrish |

FOREIGN PATENT DOCUMENTS

| EP | 0039785 B1 | 11/1981 |
| EP | 0039785 A1 | 11/1981 |

* cited by examiner

*Primary Examiner*—Steven O. Douglas
(74) *Attorney, Agent, or Firm*—Davidson, Davidson & Kappel, LLC

(57) ABSTRACT

An apparatus for filling insulation material consists of a vibrating means; a lift driving means for lifting the vibrating means; a horizontal transporting means for horizontally transporting the vibrating means and the lift driving means along the guide rail of the storage tank; an automatic winding means; a level sensing means for checking the amount of filling of the insulation material; a flux preventing means for securely maintaining the flux in the horizontal direction and verticality of the vibrating means; a descending position sensing means for restricting the descending position of the vibrating means by touching the insulation material; a control means for checking the amount of the insulation material filled along with automatically remote controlling the vibrating means, the level sensing means and the lift driving means; and a display means for directly observing the inside through a camera.

15 Claims, 8 Drawing Sheets

APPARATUS FOR FILLING INSULATION MATERIAL AND METHOD THEREOF

BACKGROUND OF THE INVENTION

1. Field of the Invention

The present invention relates to an apparatus for filling insulation material into a super low-temperature storage tank and to a method thereof. More particularly, the invention enables to fill insulation material between internal and external walls of a storage tank by radio remote and/or wire control and easily monitor the states of filling, thereby maximizing the efficiency of system management and moreover facilitating of an easy operation of the apparatus.

2. Description of the Related Art

In general, along with the development of petroleum chemistry industry and natural gas industry, the use of liquefied petroleum gas (LPG) and liquefied natural gas (LNG) has been drastically increased and accordingly the need to construct a super low-temperature storage tank for storing those gases is growing.

In order to transport or store large amounts of those LPG and LNG, because it is very difficult to transport them in the state of gas, there has been used a method of liquefying those gases at a super low temperature and a high pressure. The method allows an easy storage and transportation of those gases at a low cost in large scale.

However, the super low-temperature storage tank needs to be kept in hundreds degrees below zero and thus is exposed to breakage due to the cold shortness of metal. Besides, as the contents are potentially dangerous gas compressed at a high pressure, its manufacture needs a high technique.

The super low-temperature storage tank needs vaporization control and heat intake control, for the liquid stored is vaporized by intake of outer heat. Normally the ratio of vaporization is restricted to 0.05 to 0.2 %/day. In order to satisfy the ratio of vaporization, the maximum permissible heat-intake should be under control and a proper insulation system is demanded.

Moreover, even in the system specifically designed to operate at a certain temperature by using an insulation system to thereby prevent from the loss of vaporization, if there is a difference of temperature from outside, the heat stream is facilitated and causes problems. Therefore, to block such heat stream, an appropriate insulation material is filled in about 0.5 m to 1 m of insulating space between the internal and external walls of the tank, thereby reducing the vaporization of the gas stored.

As for the insulation materials, an expansion perlite has been used mostly. The insulation material is supplied to the vacant space between internal and external walls of the storage tank through a multiple number of nozzles formed on the roof of the tank. The insulation material supplied mainly blocks out the heat from outside and keeps the gas inside safely at a super low temperature. However, the insulation material supplied to the storage tank consists of minute particles of irregular forms and there should be an unnecessary space among particles, thus unless a very effective filling is conducted, which results in the decrease of filling efficiency of the insulation material and finally reducing the performance of insulation.

Furthermore, while the insulation material supplied is sinking, dews are formed on the external wall and dried. Occasionally, even frosts formed result in the increase of vaporization, which may extend the operational time of the compressor in the liquefaction facility. In the extreme case, the compressor cannot stand the overload, causing a fire or more serious problem of discharging surplus gas.

In order to solve such problems, when filling insulation material between the internal and external walls of the low-temperature storage tank, a vibrator is used for compulsively vibrating the material filled, thus leading to the more efficient filling.

If the compulsory vibrating step is missed out of the filling process, the insulation material filled in LNG storage tank is naturally sinking after a certain period of time. The sinking of the insulation material is led to a vacation of the upper space of the tank, causing the formation of ice on the wall of the tank. Besides, while operating, the tank is contracted and thus in need of replenishment of the insulation material. Consequently the tank is exposed to a danger of an inflammation or an explosion of the gas, or even the toxicity of the gas, which may lead to a potential loss of lives.

Therefore, the most effective and compulsory way to fill insulation material, to enhance the performance of insulation and to safely maintain the liquid stored is to perform the step of filling the insulation material simultaneously with compulsively vibrating the tank by using the vibrator.

As for the design where the external wall of the storage tank is formed of metal, there have been proposed U.S. Pat. Nos. 4,633,086, 4,614,436 and 3,633,878 wherein a magnetic vibrator is attached to the metal wall so that the vibrator vibrates the metal wall, thus inducing the insulation material filled in compact through the compulsive vibration.

However, the method of inducing the vibration from the vibrator to the insulation material for the compressed filling is problematic in that the insulation material cannot be filled evenly all over the area. Moreover, as the vibrator is magnetically attached to the external wall, the method is not applicable to the structures where the external wall is made of concrete or the insulation material is attached between internal and external walls.

On the other hand, the method where the insulation material is filled into the super low-temperature storage tank whose external wall is made of concrete has been proposed in U.S. Pat. No. 3,731,907 and Europe Patent No. 39785A1. However, with the structure, the ratio of filling cannot be expected and thus the worker has to measure the ratio by using a manual tool such as a thread or a tapeline inside the storage tank, which is very dangerous for the worker. On top of it, while vibrating, the worker needs to check the state of vibration inside the tank by hand every moment and is always exposed to dusts swirling inside the tank, which is bad for the worker's health.

In a conventional technique, a vibrator is directly sunk in the insulation material, thereby enabling of a compressed filling. It, however, is also difficult to measure the accurate rate of the sinking and even needs re-filling work and therefore it not only requires lots of effort and costs but also takes long period of time to finish. Specifically, It is very risky job for the worker to enter the tank and check by hand the rate of sinking inside the tank.

SUMMARY OF THE INVENTION

Accordingly, in order to solve the aforementioned problems, it is an object of the present invention to provide an apparatus for filling insulation material between the internal and external walls of the storage tank by radio remote and/or wire control while accurately monitoring the state of filling, thus maximizing the efficiency of the system operation.

Another object of the present invention is to provide a method of filling insulation material by radio remote and/or wire central-control from outside the tank and thereby enhancing the convenience of the work as well as ensuring safety by removing any potential dangerous factors.

In order to accomplish the aforementioned objects, the apparatus for filling insulation material comprises: a vibration means made up of a vibration plate element vibrating buried in the insulation material supplied between the internal and external walls of a super low-temperature storage tank, a lower plate connected to attach and detach the upper part of a shaft of the vibrating plate element, a vibrator for generating the vibration installed on the lower plate and furthermore vibrating the vibrating plate element via the lower plate, and an upper plate for covering the vibrator, connected to the lower plate through a plurality of vibration buffering elements and having a rolling element to enable of rotation by a plurality of support shafts; a lift driving means made up of a winding motor, a drum revolving by the winding motor, and a wire wound up on the drum wherein the lower part of the wire is wound up on the rolling element of the vibrating means so as to drive the vibrating means along with the ratio of winding the wire; a horizontal transporting means wherein a pair of rollers are installed to transport by a transport motor without digression in slide along a guide rail attached on a bracket on a ceiling of the storage tank and rolling at a certain intervals supported by the first, second and third support frames, the first to third support frames working continuously with a connection frame; an automatic winding means interlocked to the second support frame of the horizontal transporting means at one side of the lift driving means, one end of its cable being wound up on a winding roll and the other end of its cable being connected to the vibrating means; a level sensing means connected to the third support frame of the horizontal transporting means on the other side of the lift driving means and controlling the filling amount of the insulation material filled in a spacious part between the internal and external walls of the storage tank; a flux preventing means made up of a bracket attached to the lower and upper plates of the vibrating means to project out and upwardly and a tamping roller shaft-supported to revolve on an end part of the bracket and buffering the collision impact between the internal and external walls of the storage tank as well as maintaining in stability the horizontal flux and verticality of the vibrating means; a descending position sensing means placed lower than the vibrator on both sides of the vibrating means and restricting the descending position of the vibrating means by touching the insulating material; a controlling means for checking the filling amount of the insulation material filled by a signal received from the level sensing means and thereby remote-controlling the driving means, the horizontal transporting means and the vibrator; and a display means made up with a camera integrated with the vibrating means, a lighting lamp and a monitor capable of a direct observation of the inside through the camera from outside of the storage tank.

Furthermore, the present invention provides a method of filling insulation material comprising the steps of: filling the insulation material at a certain height between the internal and external walls of a storage tank; lowering a vibrating means by driving a lift driving means; stopping the descending of the vibrating means automatically at the same when a descending position sensing means connected to the vibrating means comes in contact with the insulation material filled; driving a vibrator of the vibrating means to vibrate a vibrating plate element inserted into the insulation material, thereby compressing the insulation material filled; stopping the driving after the vibrating means is operated for a predestined time; elevating the vibrating means by driving the lift driving means; transporting the structure connected to a horizontal transporting means by a certain pitch along a guide rail by driving the transporting motor of the horizontal transporting means; checking the levels of the filling of the insulation material by using a level sensing means at a random transporting position of the horizontal transporting means; and repeating the step of lowering the vibrating means by driving the lift driving means at the aforementioned position.

DETAILED DESCRIPTION OF THE PREFERRED EMBODIMENTS

Figure 1:
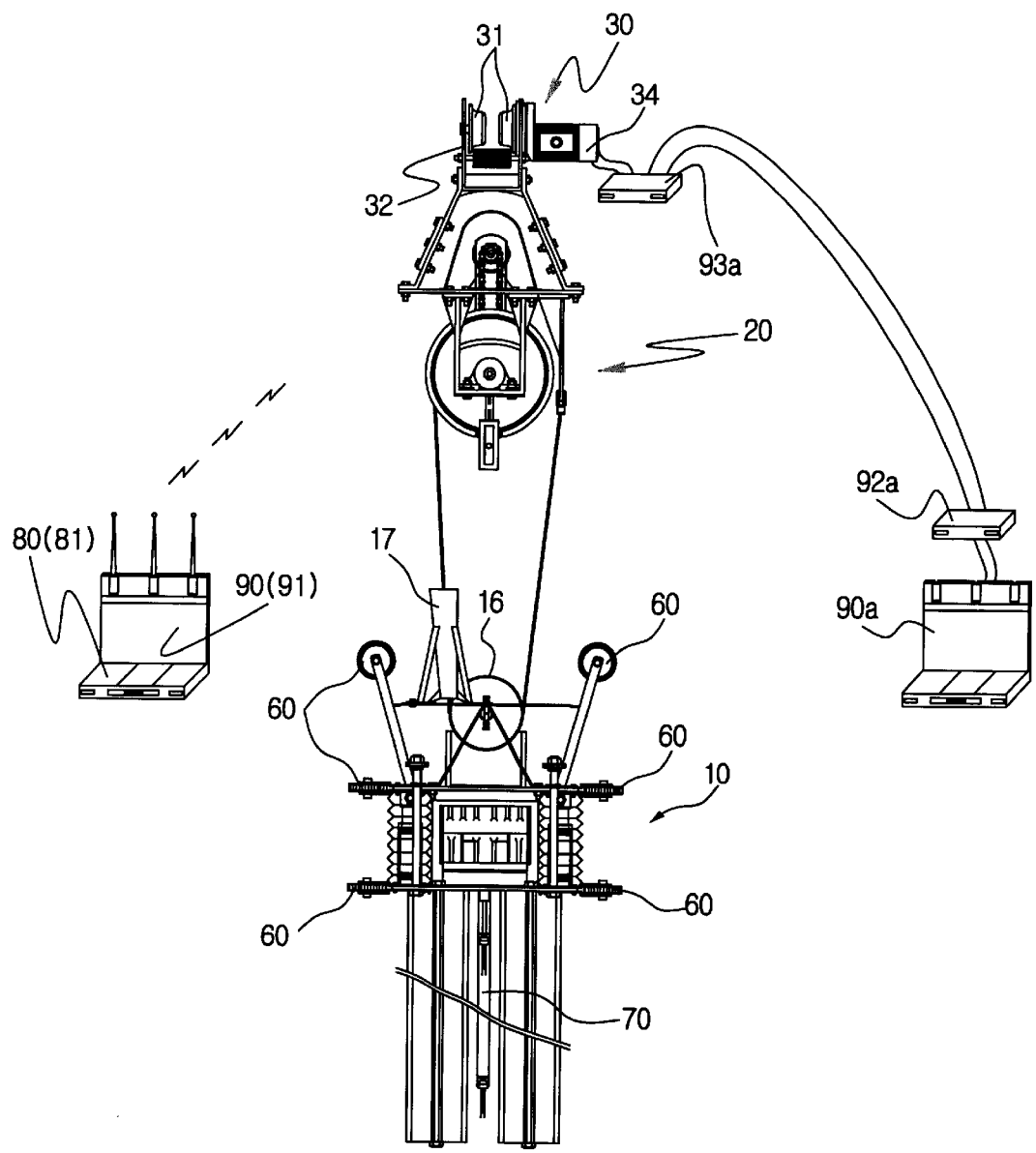
FIG. 1 is a side view of a filling apparatus according to the present invention.
Figure 2:
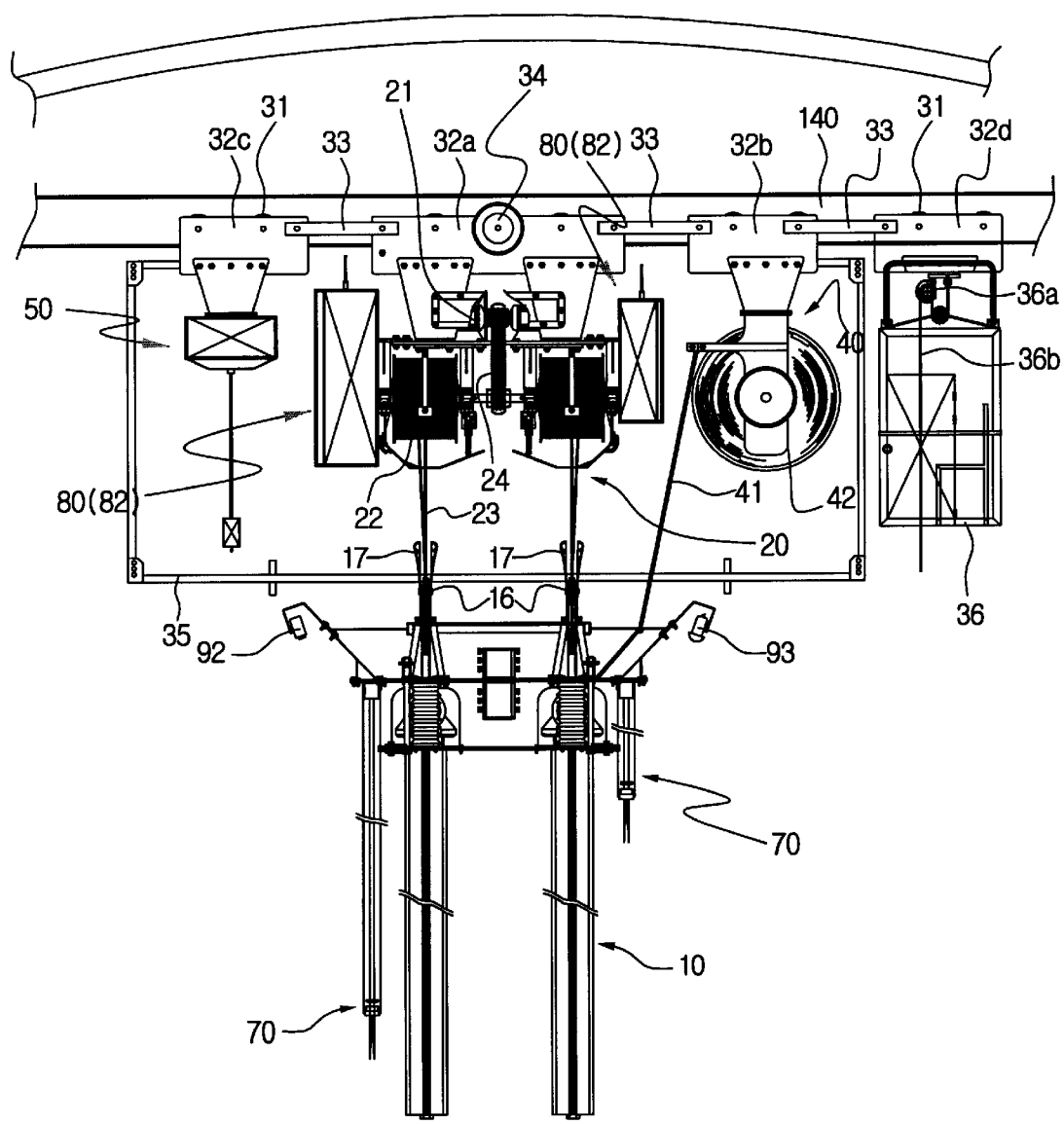
FIG. 2 is a front view of the filling apparatus according to the present invention.

FIGS. 1 and 2 are front and side views showing the entire structure of the present invention, roughly consisting of a vibrating means 10, a lift driving means 20, a horizontal transporting means 30, an automatic winding means 40, a level sensing means 50, a flux preventing means 60, a descending position sensing means 70, a control means 80 and a display means 90.

Figure 3:
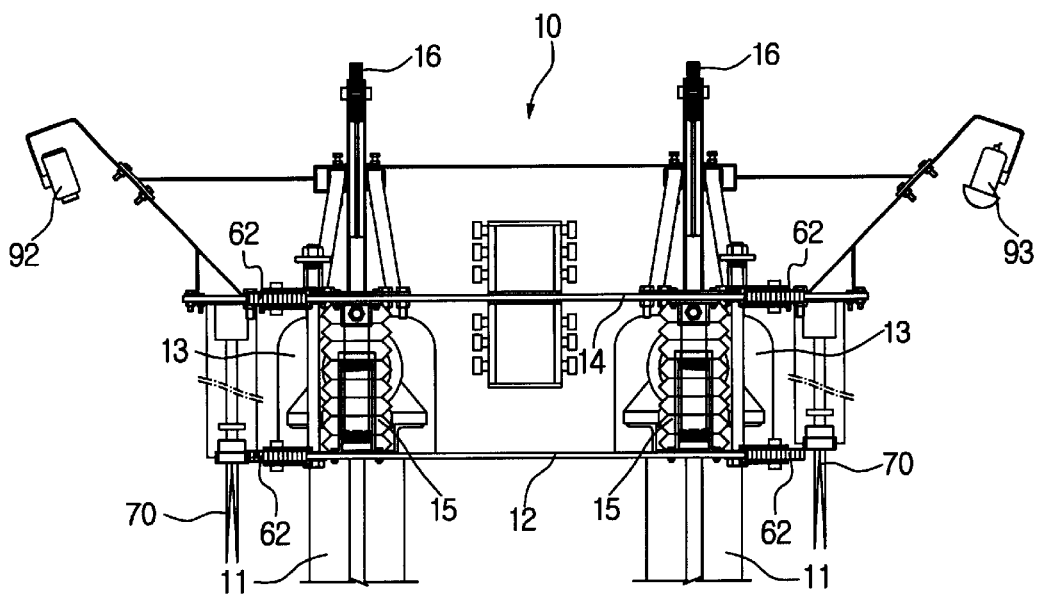
FIG. 3 is an extended front view of a vibrator according to the present invention.
Figure 4:
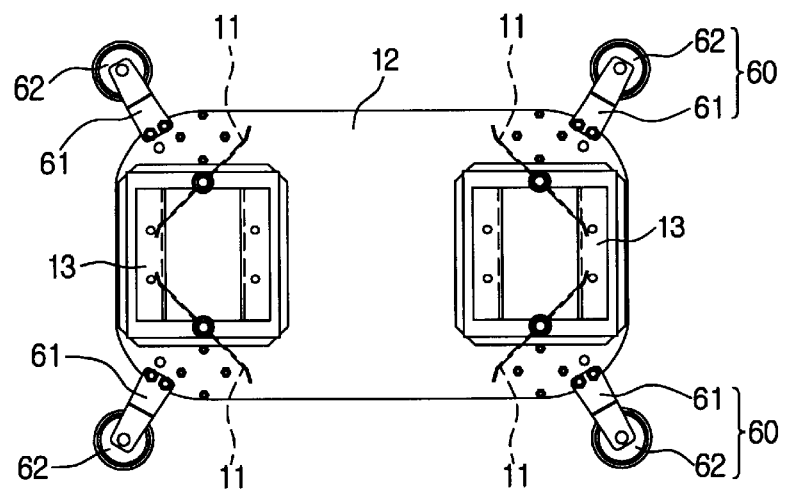
FIG. 4 is a plan view of a lower plate of the vibrator according to the present invention.

The vibrating means 10, as shown in FIGS. 3 and 4, roughly consists of a vibrating plate element 11, a lower plate 12, a vibrator 13 and an upper plate 14.

The vibrating plate element 11 vibrates the insulation material filled between the internal and external walls of the storage tank in order to increase the filling density of the insulation material, consisting of a vertical body and a multiple number of plates attached in a radial manner to the vertical body. Its length is shorter than the height of a dose of insulation material filled into the inside of the storage tank and its upper part is shaft-fixed in vertical manner. The vibrating plate element 11 can be structured to have a thin blade combined with the vertical shaft or integrated into one body, using not a vertical shaft but a vertical elastic flat plate attached thereto. The lower plate 12 is a supporting element attachable to or detachable from the upper part of the vibrating element 11. More than a pair of vibrating elements 11 can be connected to the lower plate 12.

The vibrator 13 causes the actual vibration in the vibrating means 10. It is formed on the upper part of the lower plate 12 so that it vibrates the lower plate 12 in accordance with the vibrating plate element 11 connected thereto.

The vibrating plate element 11 is preferably connected to the lower plate 11, in specific, for its upper part to be connected directly under the vibrator 13.

The upper plate 14 is a cover plate separated from the upper plate 12 at a constant distance whereas a multiple number of vibration-buffering elements 15 are structured in-between in order to buffer the vibration from the vibrator 13 transferring to the upper plate 14. For the vibrating buffering element 15, vertical tubes and shafts having different diameters are formed where the upper surface of the lower plate 12 is facing the base surface of the upper plate 14 at a constant distance. The tubes and shafts are connected to work in slide, preferably equipped with an elastic means on the outside.

Figure 5:
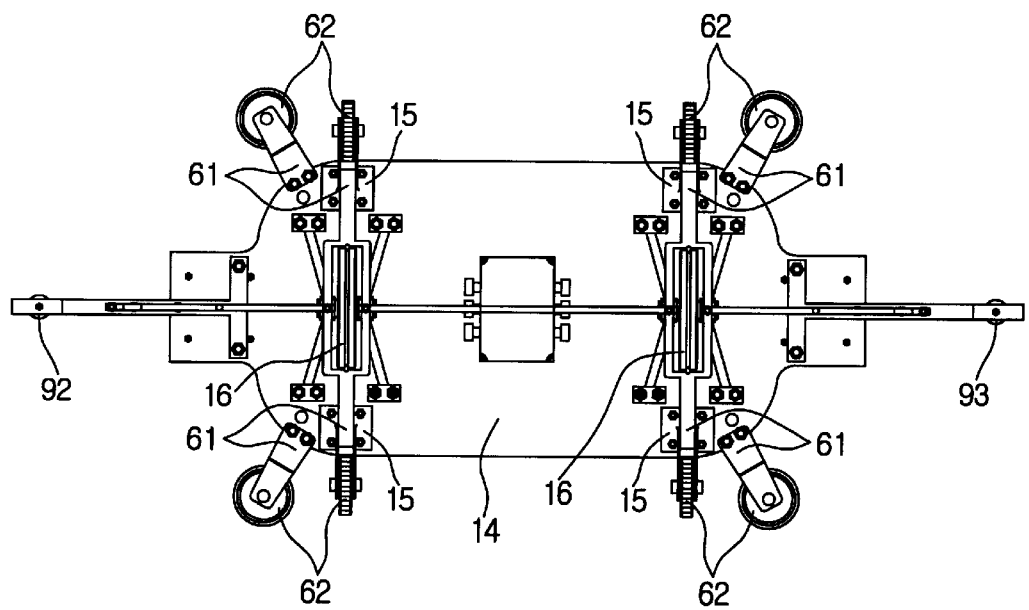
FIG. 5 is a plan view of the vibrator according to the present invention.

The upper plate 14, as shown in FIG. 5, has a multiple number of support shafts where two corresponding rolling elements 16 are fixed on a shaft to revolve respectively on both sides.

Figure 6:
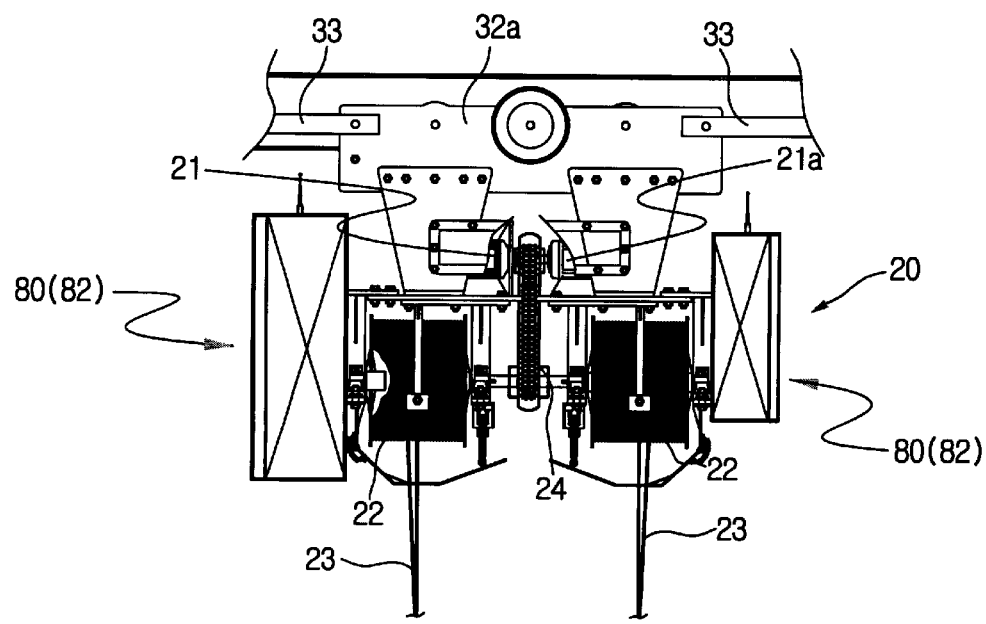
FIG. 6 is a front view magnifying an elevating driving means and a horizontal transporting means according to the present invention.

The lift driving means 20 as shown in FIG. 6, is roughly made up of a winding motor 21, a roll drum 22 rolling by the winding motor 21 and a wire 23 wound up on the roll drum 22. Here, one part of the wire 23 is fixed to the roll drum 22 or to a fixed structure close to the roll drum 22 and the other part of the wire is fixed to the roll drum 22 connected to move in accordance with the winding motor 21 so that the wire 23 can be wound as the roll drum 22 is revolving. The wire 23 as shown in FIG. 2 elevates the vibrating means 10 at a constant height, revolving the rolling element 16 of the vibrating means 10 in accordance with the degree of winding the wire 23 on the roll drum 22.

Meanwhile, the lift driving means 20 simultaneously drives the two roll drums 22 by using one winding motor 21. Here, in order to drive at a correct position when the winding motor 21 is lifting the vibrating means 10, a brake motor 21a is also placed on a side of the winding motor 21 or in the direction to face the motor 21. As the vibrating means 10 is lifted, it is difficult to control the position due to a rotary inertia and the brake motor 21a is solving the problem.

The wire 23 drawn out from a pair of roll drums 22 rotates respectively one pair of rolling elements 16 placed on top of the vibrating means 10 and drawn out downward, thereby evenly lifting the vibrating means 20.

In the structure where the winding motor 21 is not placed on the same shaft as the roll drum 22, as shown in FIG. 6, it is desirable to connect the driving shaft of the winding motor 21 with the shafts of a pair of roll drums 22 by using chain 24 so that the driving power from the winding motor 21 is stably transferred to the roll drum 22.

Figure 7:
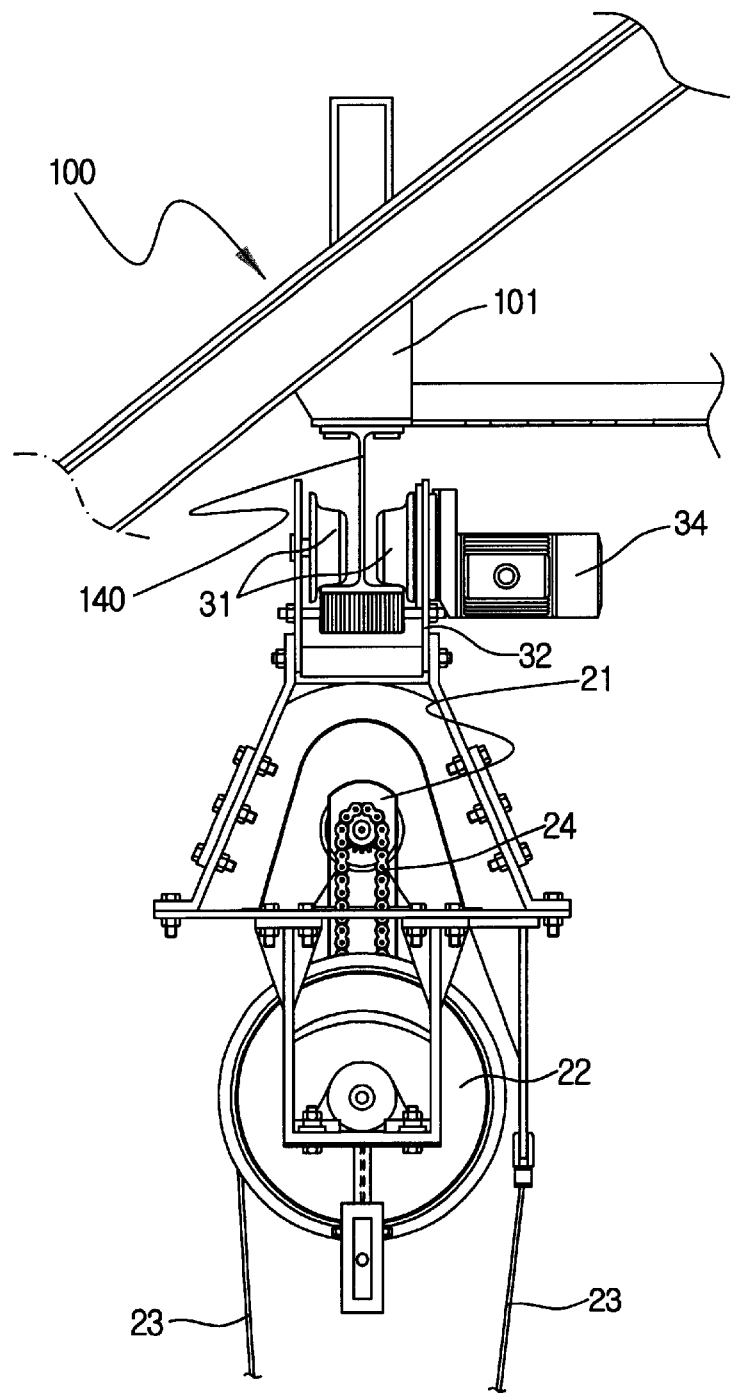
FIG. 7 is a side view of the elevating driving means and the horizontal transporting means according to the present invention.

The horizontal transporting means 30 as shown in FIG. 7, is attached to the roof of the storage tank 100 by bracket 101 so that the lift driving means 20 can slide along a guide rail 140. On both sides of the guide rail 140, a pair of rollers 31 are formed to roll on both sides of the guide rail 140. The pair of rollers 31 are shaft-supported by a support frame 32 that connects the plate on the corresponding side and the plate on the lower part of the guide rail 140.

The roller 31 as shown in FIGS. 1 and 2 has three pairs in total in the longitudinal direction of the guide rail 140, each roller 31 is respectively shaft-supported by first, second and third support frames 32a, 32b and 32c, and each support frame is connected continuously to move by a connection frame 33.

A support frame 32 among those support frames 32 has a transporting motor 34 on one side that enables a pair of rollers 31 to roll connected on the same shaft. By driving the transporting motor 34 installed on a support frame 32, a pair of rollers 31 supported to roll on the support frame 32 can accordingly revolve and be transported along with the guide rail 140. Here, the roller 31 shaft-supported on the other support frame 32 is rolling to transport the whole apparatus.

The automatic winding means 40 as shown in FIG. 2 consists of a winding roll 42 and a cable 41 wound up on the winding roll 42. The winding roll 42 is combined to roll with the bracket fixedly locked to the second support frame 32b and elastically winds up the cable 42 transferring an electric signal.

The winding roll 42 has elasticity to roll in a direction of winding of the cable 41 so that the cable 41 drawn out of the winding roll 42 maintains a constant tension when the vibrating means 10 is elevating.

The level sensing means 50 as shown in FIG. 2 is fixed to the third support frame 32c on the other side corresponding to the automatic winding means 40, thereby checking the actual rate of filling of the insulation material. For this level sensing means 50, a sounding level sensor is used besides the sort such as high frequency sensor or a photo sensor.

The flux preventing means 60 is structured to have a bracket 61 is projected radially at a certain length in a horizontal direction outward on the upper and lower plates 12 and 14 of the vibrating means 10; a horizontal flux preventing element having a tamping roller 62 rolling and shaft-fixed to the end part of the bracket 61; and a vertical flux preventing element where the bracket 61 is projected upward on the upper plate 14 and a tamping roller 62 is shaft-fixed on its end. It is desirable to form the bracket 61 of the flux preventing means 60 to allow of the control of the length according to the width between the external and the internal walls of the storage tank.

The descending position sensing means 70 as shown in FIGS. 2 and 3 restricts the descending height of the vibrating means, descends simultaneously with the vibrating means 10 and directly comes in contact with the insulation material. The upper part of the descending position sensing means 70 is connected to the upper plate 14 that is larger than the lower plate 12 of the vibrating means 10. Its sensing part for touching the insulation material is preferably placed under the lower plate 12. Such descending position sensing means 70 interrupts the driving of the winding motor 12 of the lift driving means.

The control means 80 remote controls the aforementioned driving means in radio outside the storage tank, and also allows an automatic control by a program set or a manual control by a random operation.

The control means 80 is made up with an external transceiving controller 81 and an internal transceiving controller of the storage tank. Between the controllers 81 and 82, a signal or information is transceived wirelessly through telecommunication. Each driving means in the internal transceiving controller 82 is operated by wire. As the external transceiving controller 81 cannot selectively control each driving means, it generates a command for driving to the internal transceiving controller 82 that is accordingly selectively driving each driving means connected by wire.

As for such driving means connected to the internal transceiving controller 82, there are the driving motors of the vibrating means 10, elevating means 20 and the horizontal transporting means 30. Controlling of the driving motors is conducted by feed-backing data value input from the level sensing means 50 and descending position sensing means 70 so that the control variable received from the external transceiving controller 81 enables of an accurate control of each driving means.

The display means 90 roughly consists of a monitor 91 outside the storage tank 100, internal camera 92 and a lighting lamp 93. The state of filling of insulation material taken by the camera 92 is monitored to see through the monitor 91. In order to light up the inside for the better observation through the monitor 91, the lighting lamp 92 is installed on an end to correspond with each other on the upper plate 14 of the vibrating means 10 at an angle to illuminate the lower part of the vibrating plate element 11 on which the camera 92 is focusing.

The monitor 91 of the display means 90 is built in the external transceiving controller 81 to thereby display the filling status of the insulation material as well as the control data.

In the mean time, the present invention as shown in FIG. 1 allows not only wireless control but also wired control. That is, the display means 90 for wireless remote control or a different type of additional display means 90a can be connected to the external transceiving controller 81 by wire. Here, between the display means 90 and 90a and the external transceiving controller 81, there are modems 93 and 93a connected. To conduct a modulation and a demodulation, the modems 93 and 93a are connected by wire.

Specifically, in the present invention, as shown in FIG. 2, a box-framed work station 35 is placed on the vibrating means 10 so that a worker can directly inspect and repair the lift driving means 20, horizontal transporting means 30, automatic winding means 40 and level sensing means 50.

On one side of the work station 35 there is a box-framed lift 36 to horizontally operate in accordance with the work station 35. For the lift 36, a fourth support frame 32d is formed on the horizontal transporting means 30 by using the connecting frame 33. The fourth support frame 32d has a roller 31 to operate in accordance with other support frames 32a, 32b and 32c. A winch type pulley 36a is fixed to the fourth support frame 32d so that one end of the wire 36b wound up on the pulley 36a is fixed to the upper part of the lift 36, thereby elevating the lift by winch operation.

Figure 8:
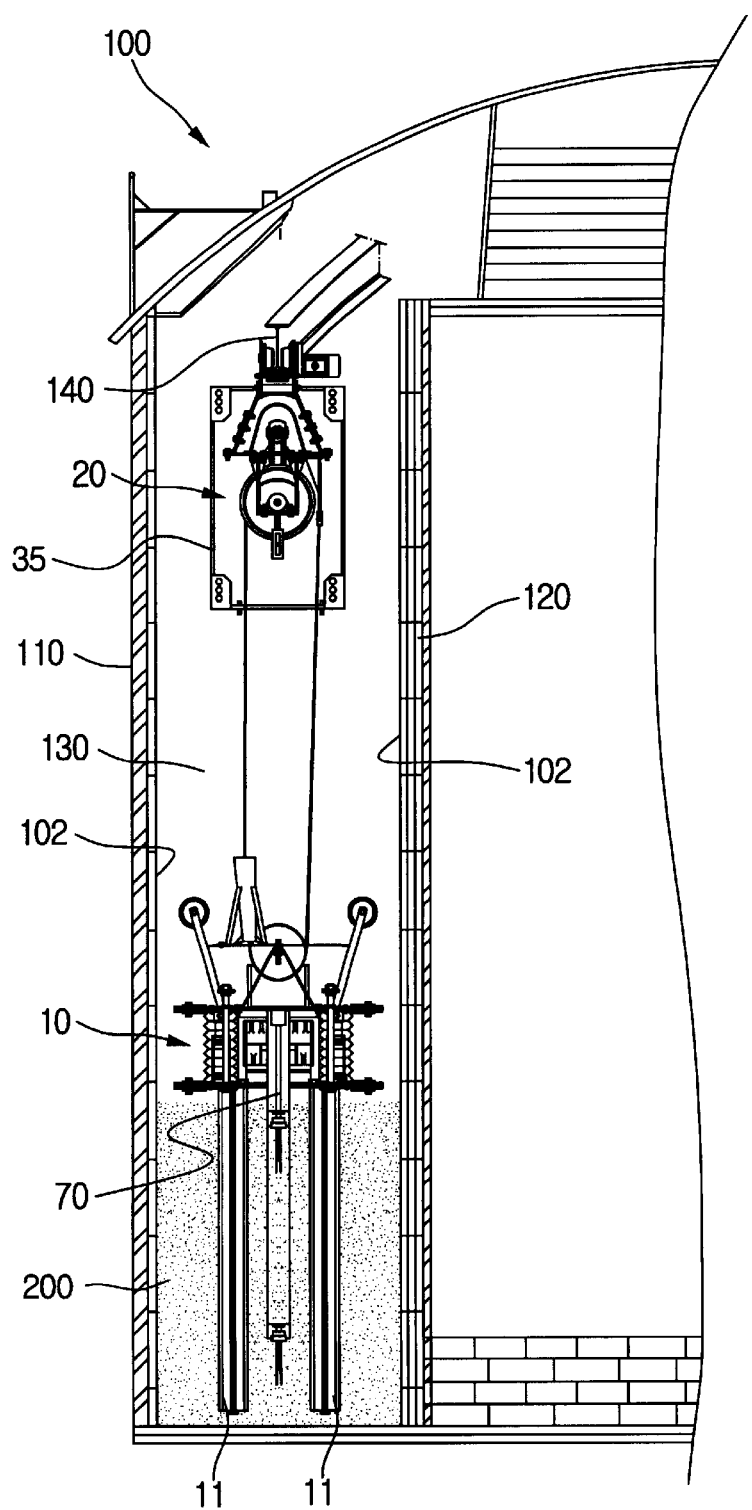
FIG. 8 is an exemplified view of applying the filling apparatus to a storage tank according to the invention.
Figure 9:
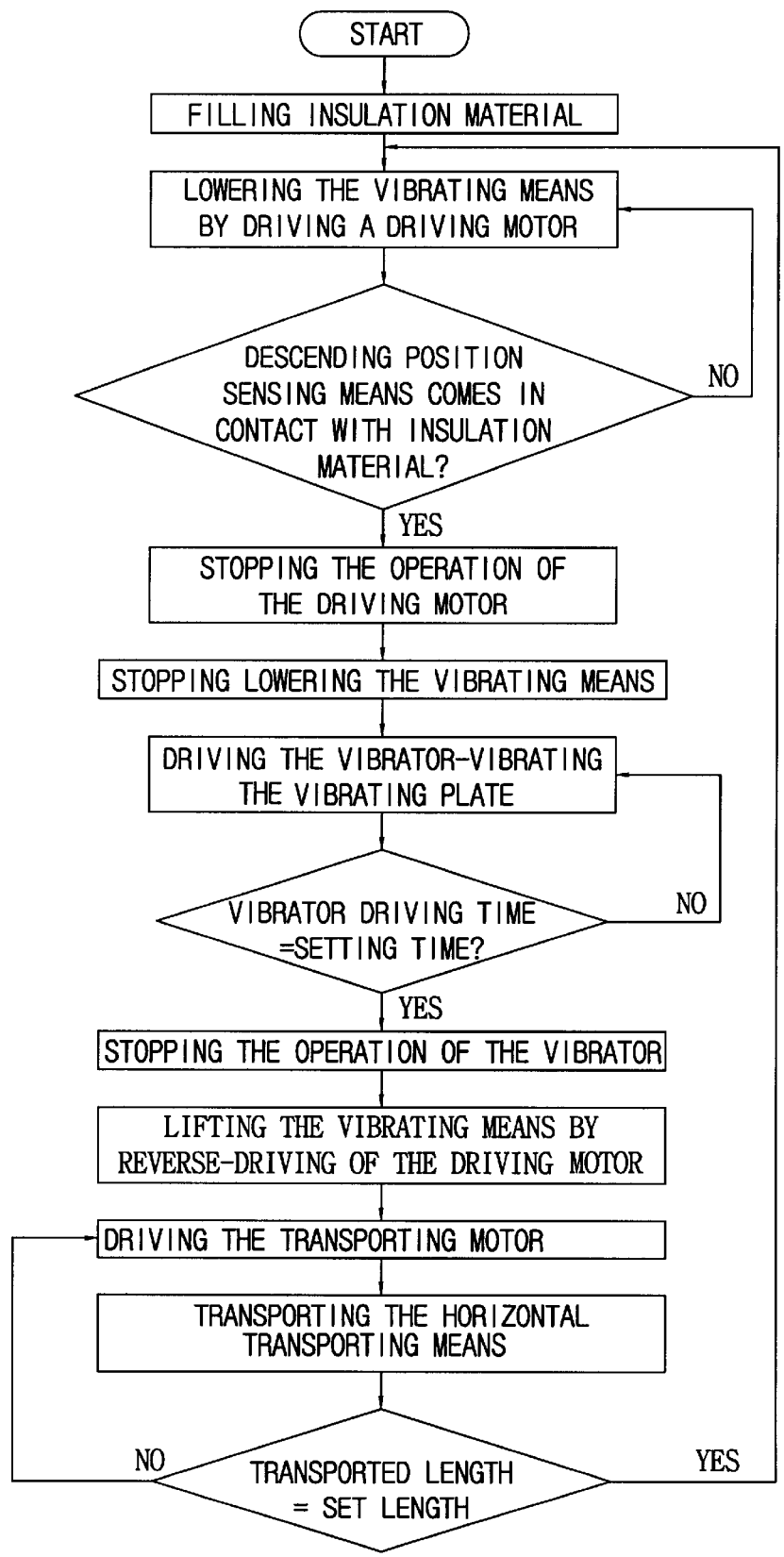
FIG. 9 is a flowchart showing the procedures of filling the insulation material according to the present invention.

The afore-mentioned structure of the present invention as shown in FIG. 8 is realized through the rollers 31 of the horizontal transporting means 30 mounted onto the guide rail 140 on the ceiling of the spacious part 130 between the external and internal walls 110 and 120 of the storage tank 100. The rollers 31 are mounted not to digress from the guide rail 140.

The super low-temperature storage tank 100 is generally made of cylinder. Its upper part is in the shape of a dome. Into the spacious part 130 between the external and internal walls 110 and 120, a certain amount of insulation material 200 is supplied.

In addition, the unexplained number 17 in the drawing is a digression preventing inlet that guides the wire drawn out of the drum 22 of the lift driving means 20 and wound up on the rolling element 16 of the vibrating means 10 not to digress from the rolling element 16.

Figure 10:
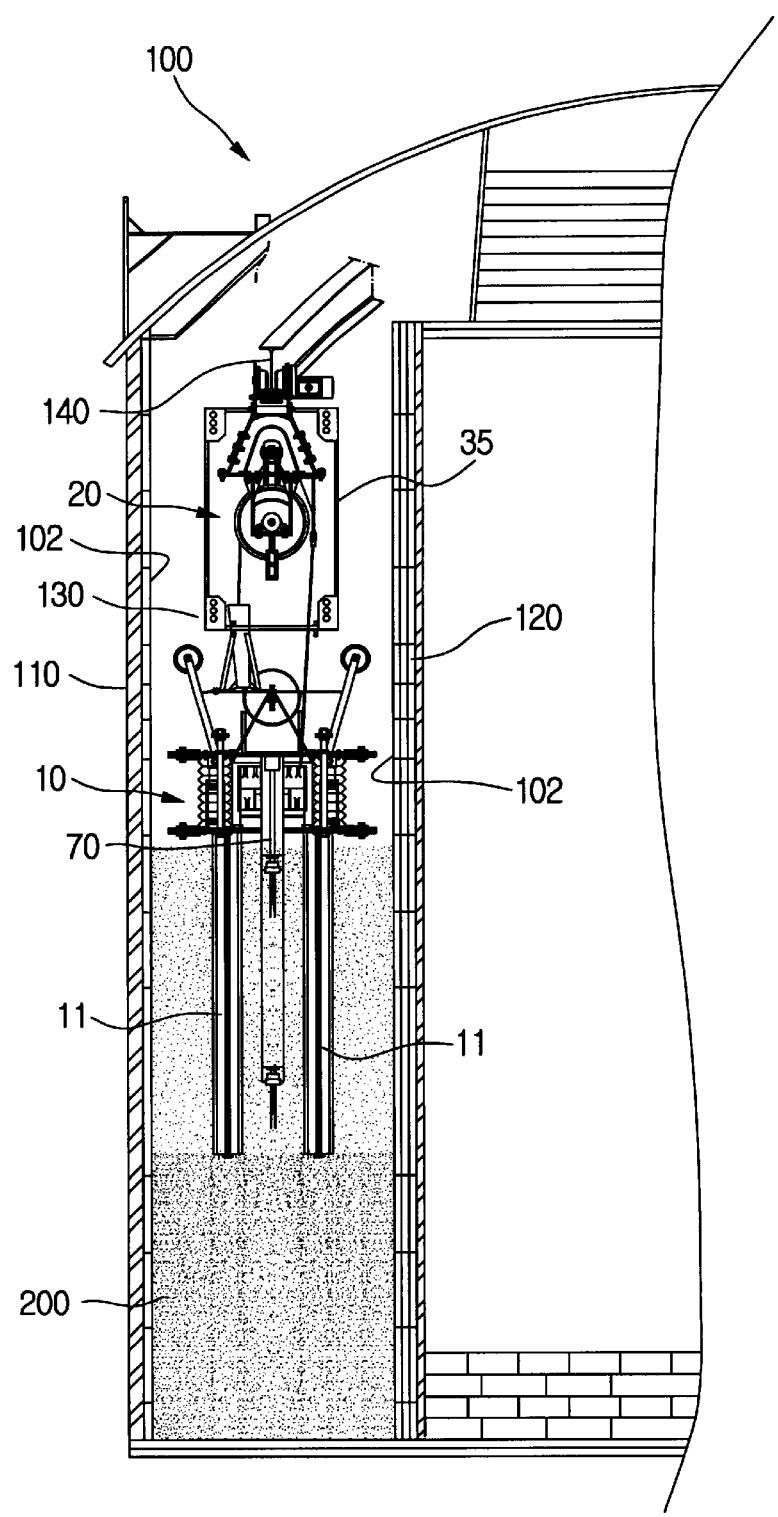
FIG. 10 is an exemplified view showing the state of compressing the insulation material according to the present invention.

A method of filling insulation material according to the present invention of aforementioned structure is conducted as shown in FIG. 10. First, a certain amount of insulation material is filled at a constant height between the external and internal walls 110 and 120 of the storage tank 100. It is desirable to fill the insulation material 200 firstly upto the half the spacious part 130 of the storage tank 100 at an angle of 180 degrees and then the other half. After the filling, the winding motor 21 of the lift driving means 20 is driven to draw out the wire 23 downward at a certain length in order to move the rolling element 16 wound up on the wire 23 downward and accordingly the vibrating means 10 is descending slowly.

While the vibrating means 10 is slowly descending, the descending position sensing means 70 connected to the vibration means comes in contact with the insulation material 200 filled and then the driving of the driving motor 21 is stopped automatically so that the descending of the vibration means 10 is stopped.

The moment when the descending of the vibration means 10 stops, a pair of vibrators 13 attached onto the lower plate 12 of the vibrating means 10 begins to drive. Accordingly a vibrating plate 11 supplied thereunder begins to vibrate via the lower plate 12. Here, the vibrating plate 11 as shown in FIG. 8 is buried under the insulation material 200 filled so that if the vibrating plate 11 is vibrating through the driving of the vibrator 13, the filling density of the insulation material 200 is increased whereby the height of the insulation material 200 is gradually lowered as in FIG. 10.

When the vibrator 13 was driven for a predestined time and stopped, the winding motor 21 of the lift driving means 20 is driven in reverse, and then the wire 23 is being wound up on the drum, thus raising the vibrating means 10 to a certain height. Here, the vibrating means 10 rises only by a certain predestined height from the surface of the insulation material 200, which was checked by the level sensing means 50.

After the vibrating means 10 was raised, the transporting motor 34 of the horizontal transporting means 30 is driven in order to move the horizontal transporting means 30 by a certain distance simultaneously with the vibrating means 10 and the lift driving means 20 integrated with the horizontal transporting means 30 as well.

While the horizontal transporting means 30 is transported along the guide rail 150 on the storage tank 100, the vibrating means 10 may swing. For this problem, the flux preventing means 60 is provided to project radially on the corners of the upper plate 14 and the lower plate 12. In other words, when the vibrating means 10 is transported horizontally, the rollers 62 of the horizontal flux preventing means formed on the horizontal direction on the lower and upper plates 12 and 14 come in contact with the internal and external walls 110 and 120 or to the insulation material 102 attached to the walls so that the horizontal flux is restricted.

The distance of the horizontal transporting means 30 to transport in the horizontal direction is predestined and at the position transported the level sensing means 50 checks the levels before and after the filling of the insulation material 200.

Specifically, the level-sensing operation by the level sensing means 50 can be conducted by the operation cycle additionally set to a certain time point or a certain pitch for transportation of the horizontal transporting means 30. Or an operator can occasionally set the right time for inspection by manual operation.

Meanwhile, now that the winding motor 21 of the lift driving means 20 can be re-driven at the position transported by a certain height, the wire 23 is drawn out downward, having the vibrating means 10 descend and thus allowing the repetitive operation later.

When the vibrating means 10 is lifted by the lift driving means 20, the verticality of the vibrating means 10 fixed only by the wire 23 would be instable and therefore flux up and down. For this problem, the flux preventing means 60 is provided on the upper plate 14 to hold at the stable position.

The insulation material 200 filled increases the density among the insulation material by the vibration of the vibrating plate element 11 so that its height is lowered.

In addition to the compressed operation of the vibration plate element 11, the first operation of filling the insulation material 200 is conducted by filling at once at an angle 180 degrees into the spacious part 130 between the external and internal walls 110 and 120 of the storage tank.

By repeating this process of filling, we can reach up to the desired level of filling. The operation of filling of insulation material is possible only up the level where the compressing operation of the insulation material is possible by the vibrating plate 10. Thereafter, it is desirable to fill the insulation material 200 at least by supplying pressure to the upper part of the tank rather than up to the height of the internal wall. Occasionally, by changing the vibrating plate element 11 of the vibrating means 10 into a rather shorter one, the height of compressing inside the tank 10 can be raised. By the process above, until the vibrating means 10 is raised to the utmost level, the insulation material is filled and all the operations are completed.

Besides, the filling amount of the insulation material 200 is checked constantly by the level sensing means 50. Through the display means made up of a camera 91 integrated with the vibrating means 10 and the monitor 90 installed outside the storage tank 100, the filling status of the inside can be checked from outside. That is, the present invention is structured to enable of a remote control of the storage tank 100 from outside and of a wired control of the operations inside the storage tank 100. This is enabled just by using the existing display means 90 or providing an additional portable display means 90*a* to thereby connect with the external transceiving controller 81 by wire and by providing with modems 92*a* and 93*a* for modulating and demodulating between the display means and the external transceiving controller 81.

In the mean time, if the lift 36 is provided on one side along with the work station 35 in the storage tank 100, the operator can go up on the lift 36 and operates the present invention by wire at a close distance by using the aforementioned portable display means 90*a*. Also the operator can move to the work station 35 to directly inspect the facilities and respond to any breakdown occurred. Specifically, the worker can go down to the bottom of the storage tank 100 by using the lift 36 and directly check the inside or the filling status of the insulation material, thereby facilitating of the correct filling of the insulation material as well as its maintenance.

As described above, the present invention facilitates to fill or compress the insulation material 200 supplied from outside into the storage tank 100, also provides a correct checking of work operations and enables of an automatic operation by remote control, therefore minimizing the possibility of danger and labor force.

Moreover, the present invention is very economical, for it can expect the processing speed and operation time of work in advance by electrical control and reducing the entire work hours. Particularly, it is advantageous in that the worker enters the storage tank 10 only for the installation or remove of the apparatus and all other control processes are conducted outside, thereby enhancing the stability of the operations.

What is claimed is:

1. A filling apparatus of insulation material, comprising:

a vibration means made up of a vibration plate element vibrating buried in the insulation material supplied between the internal and external walls of a super low-temperature storage tank, a lower plate connected to attach and detach the upper part of a shaft of the vibrating plate element, a vibrator for generating the vibration installed on the lower plate and furthermore vibrating the vibrating plate element via the lower plate, and an upper plate for covering the vibrator, connected to the lower plate through a plurality of vibration buffering elements and having a rolling element to enable of rotation by a plurality of support shafts;

a lift driving means made up of a winding motor, a drum revolving by the winding motor, and a wire wound up on the drum wherein the lower part of the wire is wound up on the rolling element of the vibrating means so as to drive the vibrating means along with the ratio of winding the wire;

a horizontal transporting means wherein a pair of rollers are installed to transport by a transport motor without digression in slide along a guide rail attached on a bracket on a ceiling of the storage tank and rolling at a certain intervals supported by the first, second and third support frames, the first to third support frames working continuously with a connection frame;

an automatic winding means interlocked to the second support frame of the horizontal transporting means at one side of the lift driving means, one end of its cable being wound up on a winding roll and the other end of its cable being connected to the vibrating means;

a level sensing means connected to the third support frame of the horizontal transporting means on the other side of the lift driving means and controlling the filling amount of the insulation material filled in a spacious part between the internal and external walls of the storage tank;

a flux preventing means made up of a bracket attached to the lower and upper plates of the vibrating means to project out and upwardly and a tamping roller shaft-supported to revolve on an end part of the bracket and buffering the collision impact between the internal and external walls of the storage tank as well as maintaining in stability the horizontal flux and verticality of the vibrating means;

a descending position sensing means placed lower than the vibrator on both sides of the vibrating means and restricting the descending position of the vibrating means by touching the insulating material;

a controlling means for checking the filling amount of the insulation material filled by a signal received from the level sensing means and thereby remote-controlling the driving means, the horizontal transporting means and the vibrator; and a display means made up with a camera integrated with the vibrating means, a lighting lamp and a monitor capable of a direct observation of the inside through the camera from outside of the storage tank.

2. The apparatus as defined in claim 1, wherein the vibrators are respectively installed on both sides of the lower plate of the vibrating means and a plurality of vibrating plate elements are installed directly under the lower plate of the vibrator.

3. The apparatus as defined in claim 1, wherein one end of the wire of the lift driving means is fixed to a holding structure and the other end of it is fixed to the drum connected to continuously work with the winding motor so that when the drum is rotating, the downwardly fallen wire is wound up on the rolling element of the vibrating means to thereby lift the vibrating means.

4. The apparatus as defined in claim 1, wherein the transporting motor of the horizontal transporting means is connected to work continuously with a roller out of the pair of rollers shaft-supported by the first support frame placed on the center.

5. The apparatus as defined in claim 1, wherein the cable of the automatic winding means is made to always maintain a constant tension in case the vibrating means is lifted.

6. The apparatus as defined in claim 1, wherein the bracket for supporting the roller of the flux preventing means is capable of rotating and of adjusting the length and interval.

7. The apparatus as defined in claim 1, wherein the sensing part of the descending position sensing means is placed lower than at least the lower plate of the vibrating means and also capable of adjusting the up and down movement.

8. The apparatus as defined in claim 1, wherein the control means is made up with an external transceiving controller and an internal transceiving controller of the storage tank to transmit and receive signals or information wireless between the controllers and the internal transceiving controller operates by wire the operating means inside the storage tank.

9. The apparatus as defined in claim 1, wherein the control means enables of a wired-control by having modems for modulation and demodulation between the external transceiving controller and the portable display means.

10. The apparatus as defined in claim 1, wherein on the vibrating means, there is a box-framed work station whose upper part is fixed to the support frame of the horizontal transporting means and its one side has a fourth support frame connected to the support frame via the connection frame, the fourth support frame having a winch pulley from which one end of the wire is drawing out and connected to the upper part of the lift to thereby elevate the lift.

11. A method of filling insulation material, comprising the steps of:

filling the insulation material at a certain height between the internal and external walls of a storage tank;

lowering a vibrating means by driving a lift driving means;

stopping the descending of the vibrating means automatically at the same when a descending position sensing means connected to the vibrating means comes in contact with the insulation material filled;

driving a vibrator of the vibrating means to vibrate a vibrating plate element inserted into the insulation material, thereby compressing the insulation material filled;

stopping the driving after the vibrating means is operated for a predestined time;

elevating the vibrating means by driving the lift driving means;

transporting the structure connected to a horizontal transporting means by a certain pitch along a guide rail by driving the transporting motor of the horizontal transporting means;

checking the levels of the filling of the insulation material by using a level sensing means at a random transporting position of the horizontal transporting means; and repeating the step of lowering the vibrating means by driving the lift driving means at the aforementioned position.

12. The method as defined in claim 11, wherein the filling operation is conducted by continuously repeating the step of filling the insulation material at a time in the range of 180 degreees, to cover a half area of a spacious part of the storage tank.

13. The method as defined in claim 11, the lifting height of the vibrating means is set to keep a constant height from the surface of the insulation material checked by the descending position sensing means.

14. The method as defined in claim 11, wherein the level sensing means checks the filling ratio of the insulation material at a certain transport position of the horizontal transporting means.

15. The method as defined in claim 11, the level sensing means randomly checks the amount of filling of the insulation material at the transport position of the horizontal transporting means.

* * * * *